Patented Apr. 20, 1954

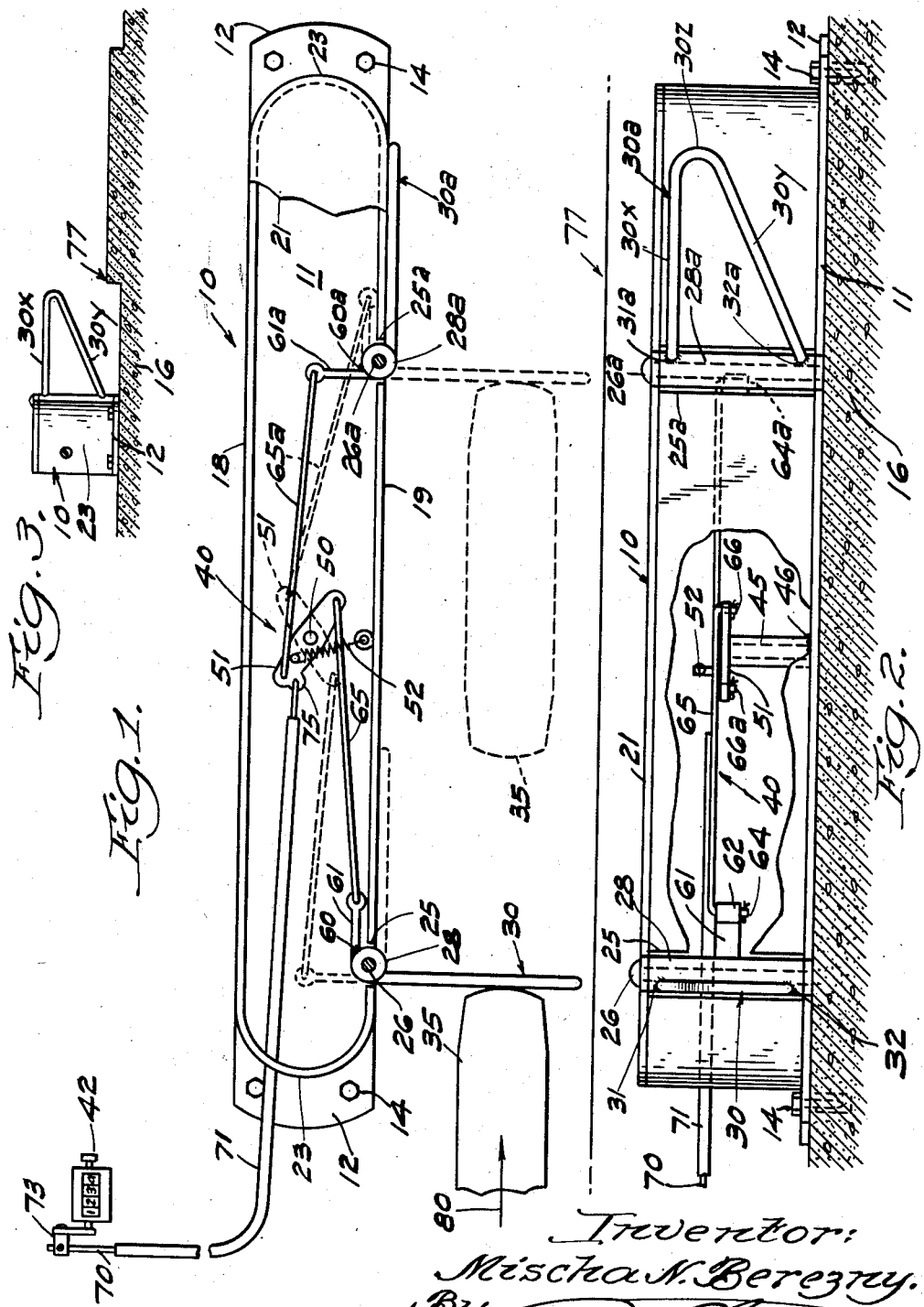

2,675,964

UNITED STATES PATENT OFFICE 2,675,964

AUTOMATIC VEHICLE COUNTER

Mischa N. Berezny, Huntington Park, Calif.

Application November 28, 1952, Serial No. 323,052

8 Claims. (Cl. 235—91)

This invention relates to a vehicle counter which is automatically operated by the wheels of vehicles passing alongside thereof.

It is well known that, in car washing establishments, the vehicles to be washed are trailed in succession along a line which passes adjacent to the wash rack, and in order to compel a correct count being made of the advancing cars each car is thus caused to pass over an automatic vehicle wheel operated counter actuating means. Heretofore it has been the usual practice to provide said counter actuating means with one or more treadles, which are depressed by the wheels passing over them. This arrangement, however has objectionable features, one of them being that such treadles more or less obstruct the advance of the vehicle wheels and jar them in an undesirable manner. Or if, to avoid this jarring effect, the upper surfaces of the treadles are countersunk to the level of the surface of the lane along which the vehicles are advanced, then the expense must be incurred of excavating recesses in the roadbed, and excavations of this character have hitherto been commonly made, not only to lower the treadles, but also to provide, beneath the surface of the roadbed, a chamber to contain mechanism operatively to connect the treadles with a counting device.

An important object of the present invention is to produce a device which overcomes the aforesaid objectionable features by providing horizontally swinging, vehicle wheel operable arms or wings which are carried by a casing which upstands from the roadbed.

This device is also intended to be used in parking establishments, in drive-in theatres, drive-in restaurants and in any business dealing on a commercial basis with automobile travel, in which it is desired to know the number of cars dealing with the establishment.

The device is of a more "fool-proof" character than many others of its class, for its vehicle wheel operated part cannot be blocked, because a blocking of the device would also block the progress of the cars to be counted.

From an operational viewpoint the objects of the present invention are, in the main, the same as the objects set forth in my co-pending application for patent on Automatic Automobile Counter, filed July 13, 1951, Serial No. 236,553; but the present application provides a simpler means for attaining those objects, one improved feature residing in the provision of simplified swingable wings operable by the wheels of passing vehicles, said wings comprising bent rods or bent heavy wires which can be incorporated into the device at a lower manufacturing cost.

Another object, in respect to my said co-pending application and also in regard to prior patented structures, is to provide a simplified mechanism to reset each swingable, vehicle wheel operable wing, said mechanism including a resetting spring which moves back and forth across dead center in such a manner as to insure that the resetting movement of each said wing is completely carried out.

Other objects, advantages and features of invention will hereinafter appear.

Referring to the accompanying drawing, which illustrates a preferred embodiment of the invention:

Fig. 1 is a plan view of the device with structure broken away to economize space and to show interior construction. In this view the left hand or front swingable member of the device shown in full lines in its normal, outwing position and in broken lines in the position to which it is moved in the first step of the operation of making a count; and the right hand or rear swingable member is shown in full lines in its normal inswung position and in broken lines in the outswung position to which it is moved when set in readiness for being inswung by a vehicle wheel in performing the second or final step of making a count. An approaching vehicle wheel is fragmentarily shown in full lines, and in broken lines in a farther advanced position for beginning the final step of a count making operation.

Fig. 2 is a side elevation of Fig. 1 except that the vehicle wheel is omitted, and a section of the floor with the device anchored thereto is included. In this view a portion of the front wall of the casing is broken out to disclose structure that would otherwise be concealed.

Fig. 3 is a transverse cross section on a smaller scale illustrating the position of the lane in relation to the counter which the wheels operate.

Referring in detail to the drawing, the embodiment of the invention therein shown comprises a horizontally elongated sheet metal casing 10 which is substantially rectangular in cross section. Said casing is shown having a floor 11 which is integrally provided at each end with a basal flange 12 suitably apertured to receive screw 14 whereby the casing is anchored to a roadbed 16. Said casing also includes upstanding side walls 18 and 19 and a top wall 21, said side walls being integrally united at each end by an arcuate end wall 23.

The casing side wall 19 is slotted from top to bottom at 25 to provide clearance for certain parts, including a headed vertical hinge pin 26 which has its end portions fitted within suitable apertures in the top and floor walls of the casing. Around this hinge pin is turnably fitted a sleeve 28 having a working fit between said floor and top casing walls. A first wing 30, consisting of a bent rod, has its end portions secured to said sleeve, desirably by welds 31 and 32.

Said wing 30, it will be seen, is located near one end of the casing 10. Near the opposite end of said casing is located a second wing designated 30a, both of these wings (as indicated in Fig. 1), being swingable in a horizontal plane about vertical axes, to and from positions wherein they are operable by the advancing vehicle wheel 35. Inasmuch as the mounting means for the second wing 30a is duplicative of that for the first wing 30, the parts adjacent to each wing are designated in the same manner except that the letter "a" is added to the parts adjacent to the wing 30a, including the slot 25a which affords an operating clearance for the mounting means of said wing 30a.

The wings 30 and 30a are twin structures each consisting of a rod bent near its midlength so as to have a substantially straight, horizontal upper run 30x, and upwardly inclined straight lower run 30y, these runs being united by an arcuate run 30z. When the device is in its operative position the top run 30x of each of the wing forming rods extends nearly horizontally and at the other side of the bend in the rod the run 30y extends downwardly at a considerable inclination so as to be secured to the lower end portion of the sleeve 28.

Within the casing 10 is shown the wing operated mechanism 40 which is operatively connected with the swingable wings which have been described, and is also operatively connected with a counter 42 shown in a diagrammatic fashion in Fig. 1.

Said mechanism 40 comprises a tubular bearing post 45 which upstands from the midlength part of the casing floor 11 and is secured to said floor by welding 46. This post has turnably fitted within it a vertical stub shaft 50 to the upper end of which is centrally fixed a link 51 which is loaded with a tension spring 52 anchored to the casing wall 19 and arranged normally to maintain said link in the full line position of Fig. 1. Said link is thus mounted to swing back and forth through an arc of a little less than 130 degrees.

Returning to the sleeve 28 to which the wing 30 is welded, said sleeve has welded to it by a weld 60 a strap metal arm 61 which extends at a right angle to said wing 30, and which has a curled outer end portion 62 which forms a bearing for the adjacent right angularly deflected end portion 64 of an operating rod 65, this rod having at its opposite end a deflected portion 66 which operatively engages a bearing aperture provided for it in one end of the aforesaid link 51. In order operatively to connect the opposite end of said link 51 with the other sleeve 28a a duplicate set of parts are provided lettered the same with the addition of "a."

In order operatively to connect the mechanism 40 with the counter 42, a flexible push shaft 70 is provided, this push shaft being slidably contained within a rigid, bent tube 71. Said push shaft is operatively connected at one end with the counter crank 73, the opposite end of said shaft being deflected and led through an apertured ear 75 carried by that end portion of the link 51 to which the rod 65a is attached.

It is to be understood that the device will be installed, for example, in a car washing establishment, in a situation wherein there will be along that side of the casing 10 which is provided with the wing 30 and 30a, a lane 77 which is sufficiently narrow to compel each driver to drive close enough to said casing to cause the adjacent wheels of the vehicle to operate said wings.

As indicated by the arrow 80 in the left hand portion of Fig. 1 each wheel 35 will travel from left to right as viewed in the drawing. Assuming a said wheel 35 to be a front wheel of the vehicle and the wings 30 and 30a to be in the full line positions shown, said wheel will first contact the first wing 30 and will swing that wing sufficiently far in an anti-clockwise direction so as, through arm 61 and rod 65, to move the link 51 across dead center in relation to the spring 52 whereupon said spring will complete the clockwise movement of said link, thus causing the wing 30 to be inswung to the broken line position of Fig. 1; and at the same time, through the operation of rod 65a and arm 61a causing the wing 30a to outswing to the broken line position shown. This operation will retract the push shaft 70, positioning the same in readiness for operating the counter, it being understood that it is the outward movement of said push shaft to the position shown in Fig. 1 that operates said counter.

Simultaneously with the aforesaid retraction of the push shaft and inswinging of the wing 30, through the operation of the rod 65a and arm 61a the second wing 30a will be outswung from the broken to the dotted line position of Fig. 1, so as to be in the path of the next advancing wheel 35. As said wheel passes by said wing 30a it swings this wing back to its original position, thus, through the reverse operation of the mechanism 40, restoring the wing 30 to its normal outswung position and at the same time thrusting out the push shaft 70 to operate the counter 42. As the vehicle advances the rear wheel at the side thereof adjacent to the casing 10 will cause a repitition of the aforesaid operation, thus again operating the counter. At the end of the day the count recorded by said counter will be divided by two, thus ascertaining the correct number of cars that have passed by the device.

Various types of mounting means may be provided for the swingable members 30 and 30a without exceeding the scope of the claimed invention.

I claim:

1. In a device of the kind described, a horizontally elongated casing in an upstanding anchored relation to a roadbed having alongside said casing a lane to cause the wheels at one side of a vehicle passing thereover to move along a path closely parallel to one side of said casing, mechanism within said casing operatively connected with a counter, a first wheel operable wing carried by said casing and projecting laterally therefrom to swing horizontally to and from a wheel operable position, a second wing carried by said casing and spaced lengthwise thereof in relation to said first wing and projecting laterally from said casing in a position to swing horizontally to and from a wheel operable position in relation to a vehicle wheel when the latter advances thereto after having engaged said first wing, the aforesaid mechanism being operatively connected with both of said wings so that when an advancing vehicle wheel acts upon said first wing it will, through said mechanism move said second wing in relation to said casing from an inswung position to an outswung wheel operable position to be operated when reached by the advancing wheel to cause said mechanism to operate said counter.

2. In a device of the kind described, mounting means upstanding from a lane for vehicle travel, a first and a second horizontally swingable wing carried by said mounting means, said wings being in a spaced apart relation to each other lengthwise of said lane and positioned for successive operation by a wheel of a vehicle passing along said lane, mechanism carried by said mounting means, said mechanism operatively connecting said wings to each other and also being operatively connected to a counter, said mechanism comprising a spring loaded link centrally pivoted to said mounting means to swing back and forth through an arc of somewhat less than 130 degrees, means connecting an end portion of said link with said first wing and the opposite end portion of said link with said second wing thus coordinating the swinging movement of said wings so that said first wing is normally outswung into the path of the advancing vehicle wheel while the other wing is inswung out of the path of said wheel, and vice versa, each passing vehicle wheel acting first upon said first wing to swing said link in a direction to prepare the counter actuating means for operation, and then acting upon said second wing to actuate said counter actuating means.

3. The subject matter of claim 2 and the spring with which said link is loaded being arranged to accelerate the swing of said link in both directions after passing a dead center, so as to insure the swing of each of said wings through an angle of substantially ninety degrees whenever a vehicle wheel operates the device.

4. A device of the kind described for operating a counter, comprising mounting means extending alongside a lane for vehicle travel in one direction, a vehicle wheel operable wing comprising a rod bent adjacent to its midlength through an angle of more than ninety degrees, a post carried by said mounting means, a sleeve turnably carried by said post, the end portions of said wing forming rod being secured to said sleeve in a vertically spaced apart relation to each other, and vehicle wheel operable means carried by said mounting means and operatively connected with said wing automatically to restore the latter to a vehicle wheel engageable position each time it is operated to make a count.

5. The subject matter of claim 4 and said wing when in its mounted position the rod of which it is formed having an approximately horizontal top run at one side of its bend and a considerably downwardly inclined run at the opposite side of its bend.

6. In a structure of the kind described, a horizontally elongated casing in an anchored upstanding relation to a roadbed having alongside a side wall of said casing a lane for vehicles to travel over in a closely parallel relation to said wall, said wall having therein a vertical slot, a vertical post in said casing inwardly adjacent to said slot, a sleeve turnably fitted on said post a vehicle wheel operable wing attached to said sleeve to swing in accordance with the turning movements thereof, said wing at all times being located outside of said casing and being swingable back and forth between a right angularly outwardly extending relation to said wall and an inswing position wherein it overlies the outer side of said wall in a flatwise manner, means operatively connecting said wing to a counter to cause the latter to record a count each time a wheel of a passing vehicle moves said wing to its said inswung position, and additional vehicle wheel operated means carried by said casing and operatively connected with said wing to restore it to its outwardly extending position by the advance of the next vehicle wheel after a count has been made.

7. The subject matter of claim 6 and said wing comprising a rod bent near its midlength, one end of said rod being secured to the upper part of said sleeve and the opposite end of said rod being secured to the lower part of said sleeve.

8. In a structure of the kind described, a horizontally elongated casing in an anchored upstanding relation to a roadbed having along a side wall of said casing a lane for vehicles to travel over in a closely parallel relation to said wall, said wall having two apertured portions considerably spaced apart lengthwise thereof, a part mounted in each of said apertured portions of said casing to turn about a vertical axis, a vehicle wheel operable wing carried by each of said parts to swing back and forth between two positions in one of which it is directed outwardly from said wall and in the other of which it is substantially parallel thereto, each of said turntable parts carrying an operating arm internally of said casing, a spring loaded link swingably supported at its midlength portion within said casing between said arms, a rod operatively connecting one end portion of said link with one of said arms, a rod operatively connecting the opposite end portion of said link with the other of said arms, said wings and operating arms being so angularly positioned in relation to each other that when one wing is in its inswung position, the other is in its outswung position and vice versa, the spring with which said link is loaded being positioned to accelerate each swinging movement of said link after the latter has passed to dead center position in relation to said spring, thus to ensure the completion of the swinging movement of said wings, and a counter operatively connected with said link.

No references cited.